United States Patent
Evans et al.

(10) Patent No.: US 11,401,025 B2
(45) Date of Patent: Aug. 2, 2022

(54) AIRCRAFT ASSEMBLY

(71) Applicant: AIRBUS OPERATIONS LIMITED, Bristol (GB)

(72) Inventors: Rodney Evans, Bristol (GB); David Andrew Phipps, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 506 days.

(21) Appl. No.: 16/596,045

(22) Filed: Oct. 8, 2019

(65) Prior Publication Data

US 2020/0115030 A1   Apr. 16, 2020

(30) Foreign Application Priority Data

Oct. 12, 2018 (GB) ..................... 1816660

(51) Int. Cl.
| | |
|---|---|
| *B64C 3/26* | (2006.01) |
| *B64F 5/10* | (2017.01) |
| *B29C 65/08* | (2006.01) |
| *B64D 15/12* | (2006.01) |
| *B29L 31/30* | (2006.01) |

(52) U.S. Cl.
CPC ............... *B64C 3/26* (2013.01); *B29C 65/08* (2013.01); *B64D 15/12* (2013.01); *B64F 5/10* (2017.01); *B29L 2031/3085* (2013.01)

(58) Field of Classification Search
CPC ............. B64C 3/26; B64F 5/10; B64D 15/12
See application file for complete search history.

(56) References Cited

U.S. PATENT DOCUMENTS

| 4,556,439 | A | 12/1985 | Bannink, Jr. | |
|---|---|---|---|---|
| 4,671,470 | A * | 6/1987 | Jonas | ........................ B64C 1/12 428/116 |
| 9,352,822 | B2 * | 5/2016 | Nordman | ............... B29C 66/524 |
| 2010/0077690 | A1 * | 4/2010 | Durand | .................. F16B 5/0056 29/527.1 |
| 2010/0224724 | A1 * | 9/2010 | Kamino | ................ B29C 66/721 244/1 A |
| 2013/0037655 | A1 * | 2/2013 | Bradley | .................... B64C 3/26 277/637 |
| 2020/0324916 | A1 * | 10/2020 | Basile | ..................... B64C 3/185 |

FOREIGN PATENT DOCUMENTS

| DE | 32 10 310 | 9/1983 |
|---|---|---|
| JP | 02-22034 | 1/1990 |

OTHER PUBLICATIONS

Extended European Search Report for Application No. EP 19194789. 4, 12 pages, dated Feb. 12, 2020.
Combined Search and Examination Report for GB Application No. 1816660.3 dated Mar. 28, 2019, 5 pages.

* cited by examiner

*Primary Examiner* — Michael H Wang
(74) *Attorney, Agent, or Firm* — Nixon & Vanderhye P.C.

(57) ABSTRACT

A wing leading edge assembly is disclosed including a leading edge panel and a cover panel located over the structural component. The cover panel has a thermoplastic layer with an inner surface. A thermoplastic fastening member extends through the structural component and is welded to the inner surface so that the structural component is fastened between the inner surface and the fastening member.

20 Claims, 3 Drawing Sheets

AIRCRAFT ASSEMBLY

CROSS RELATED APPLICATION

This application claims priority to United Kingdom (GB) Patent Application 1816660.3, filed Oct. 12, 2018, the entire contents of which are hereby incorporated by reference.

FIELD OF THE INVENTION

The present invention relates to an aircraft assembly, a wing leading edge assembly, an aircraft and a method of assembling an aircraft assembly.

BACKGROUND OF THE INVENTION

Aircraft wings typically include a wing box formed by forward and aft spars, ribs extending between the spars, and cover panels extending between the forward and aft spars to cover the ribs. A leading edge assembly defines the leading edge, forward of the forward spar. A trailing edge assembly defines the trailing edge, rearward of the aft spar.

The leading edge assembly typically has a leading edge panel affixed to a sub-structure, such as leading edge ribs. A cover panel may be received over the leading edge panel. Such leading edge panels and cover panels are typically bolted or riveted to the sub-structure. However, the use of such fasteners may lead to flow disruption over the leading edge assembly. For example the use of rivet or bolted fasteners is not suitable for use where tight aerodynamic tolerances are required, such as a natural laminate flow wing. The use of such fasteners can lead to protruding elements and/or deformation of the aerodynamic surface.

One option, is to bond the components of the leading edge assembly together. However, such an attachment method typically prevents the components from being easily detached from each other during maintenance, and so any damage to one component leads to replacement of the entire assembly.

SUMMARY OF THE INVENTION

According to an aspect of the present invention, there is provided an aircraft assembly comprising a structural component, a cover panel located over the structural component and comprising a thermoplastic layer with an inner surface, and a thermoplastic fastening member extending through the structural component and welded to the inner surface, with the structural component fastened between the inner surface and the fastening member.

This arrangement helps to remove the need for holes to be formed in the cover panel. With such an arrangement, fasteners for mounting the cover panel are provided on one side of the cover panel only. The arrangement does not enact a fastening force on the aerodynamic side of the cover panel. The cover panel may be straightforwardly replaced, for example as a line replaceable item.

The thermoplastic layer of the cover panel may form part of a wing ice protection system (WIPS), and may be a WIPS mat. The cover panel may comprise an outer layer over the thermoplastic layer. The outer layer may be an erosion shield. The cover panel may be a sub-assembly.

The thermoplastic fastening member may be welded to the inner surface of the cover panel by mechanical welding. Such an arrangement helps to limit over-heating of the cover panel during fastening of the cover panel with the structural component.

The thermoplastic fastening member may be welded to the inner surface of the cover panel by at least one of ultrasonic welding, spin welding, and vibration welding.

The cover panel may comprise an aerodynamic surface. The aerodynamic surface may form a natural laminar flow surface.

With such an arrangement it is possible to restrict the positioning of fasteners at or protruding from the aerodynamic surface, such as rivet heads. Extremely tight aerodynamic tolerance requirements, such as for a natural laminar flow wing, may be achieved, with limited or no interference to the aerodynamic surface resulting from attachment of the cover panel.

The cover panel may comprise an outer layer and the thermoplastic layer, the outer layer defining the aerodynamic surface.

The outer layer may be adhered to the thermoplastic layer.
The outer layer may be an erosion shield.
The cover panel may comprise a heating configuration.
The heating configuration may be embedded in the thermoplastic layer.
The heating configuration may comprise an electrically conductive mesh.
The thermoplastic fastening member may not extend through the cover panel.
The thermoplastic fastening member may comprise a shaft and a shoulder, wherein the shaft may extend through the structural component. The shoulder may be defined by a fastener head. At least part of the structural component may be between the cover panel and the shoulder.
The thermoplastic fastening member may extend through a preformed hole in the structural member.

According to an aspect of the present invention, there is provided a wing leading edge assembly comprising the aircraft assembly as set out above.

The structural component may be a leading edge panel.
The wing leading edge assembly may be a natural laminar flow wing leading edge assembly.

According to an aspect of the present invention, there is provided an aircraft comprising at least one of the aircraft assembly as set out above, and the wing leading edge assembly as set out above.

According to an aspect of the present invention, there is provided an aircraft assembly comprising a structural component, a cover panel comprising a thermoplastic layer, a thermoplastic fastening member extending through the structural component, and a coalesced juncture between the thermoplastic layer and the thermoplastic fastening member, wherein the structural component is fastened between the thermoplastic layer and the fastening member.

The structural component may be at least one of a sub-structure member, such as a rib or stringer, and a structural panel.

According to an aspect of the present invention, there is provided a method of assembling an aircraft assembly comprising locating a cover panel over the structural component, the cover panel comprising a thermoplastic layer with an inner surface; inserting a thermoplastic fastening member to extending through the structural component to locate against the inner surface; and welding the thermoplastic fastening member to the inner surface of the cover panel to fasten the cover panel to the structural component.

A kit of parts which can be assembled to provide an aircraft assembly as described above, the kit of parts comprising: a structural component, a cover panel configured to locate over the structural component and comprising a thermoplastic layer with an inner surface, and a thermoplastic fastening member configured to extend through the structural component and be welded to the inner surface, so that the structural component is fastened between the inner surface and the fastening member.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
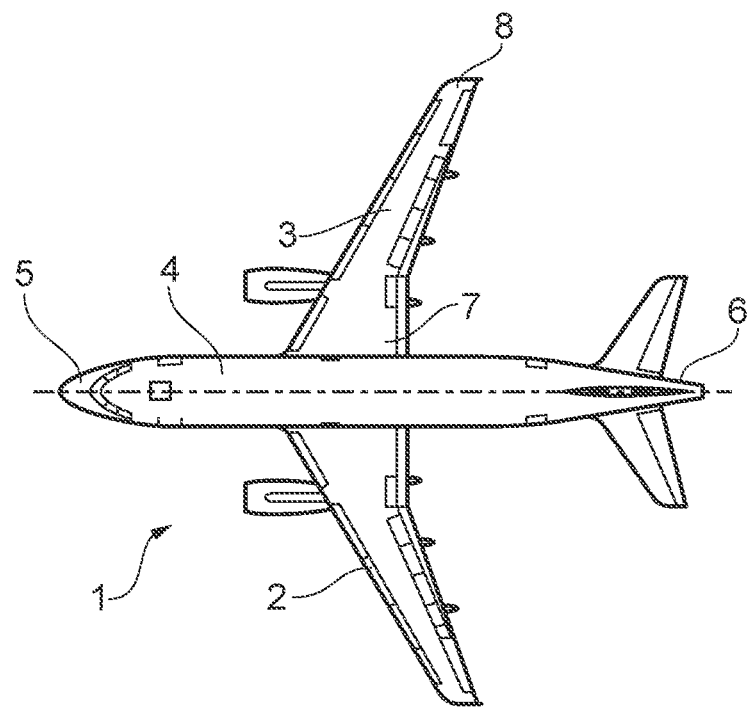
FIG. 1 is a plan view of an aircraft.

FIG. 1 shows an aircraft 1 with port and starboard fixed wings 2, 3, a fuselage 4 with a nose end 5 and a tail end 6. The aircraft 1 is a typical jet passenger transonic transport aircraft but the invention is applicable to a wide variety of fixed wing aircraft types, including commercial, military, passenger, cargo, jet, propeller, general aviation, etc. with any number of engines attached to the wings or fuselage.

Each wing has a cantilevered structure with a length extending in a span-wise direction from a root 7 to a tip 8, the root 7 being joined to an aircraft fuselage 4. The wings 2, 3 are similar in construction so only the starboard wing 3 will be described in detail with reference to FIGS. 2 to 8.

The wing box 12 includes a forward spar 15 and an aft spar 16. The forward and aft spars 15, 16 are spaced apart in a chordwise direction. Ribs (not shown) extend between the forward and aft spars 15, 16. Upper and lower covers 17 extend between the forward and aft spars 15, 16 on upper and lower sides of the wing box 12.

The leading edge assembly 13 is forward of the forward spar 15. The leading edge assembly 13 is mounted to the forward spar 15. The trailing edge assembly 14 is rearward of the aft spar 16. The trailing edge assembly 14 is mounted to the aft spar 16. The leading edge assembly 13 comprises a leading edge panel 30. The leading edge panel 30 forms an external side of the assembly 13. The leading edge panel 30 extends about leading edge ribs (not shown). The leading edge panel 30 is generally C-shaped. Edges of the leading edge panel 13 form a junction with the upper and lower covers 17. The leading edge panel 30 acts as a structural component of the leading edge assembly 13. The leading edge panel 30 and leading edge ribs together form a structural assembly. The leading edge panel 30 is formed from a composite material, although it would be appreciated that other suitable materials may be used.

Figure 3:
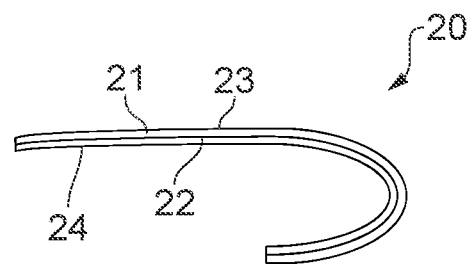
FIG. 3 is a schematic side view of a cover panel of a wing leading edge assembly of the wing.
Figure 4:
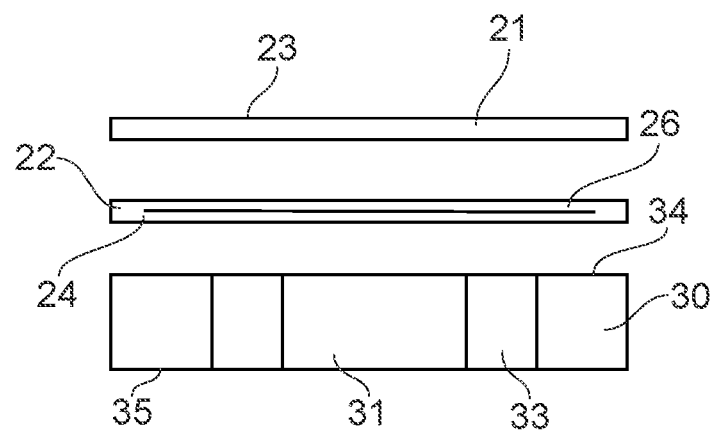
FIG. 4 is a schematic exploded cross-sectional side view of part of the wing leading edge assembly including a leading edge panel and the cover panel.

The leading edge assembly 13, acting as an aircraft assembly, has a cover panel 20, as shown in FIGS. 3 and 4. The cover panel 20 is configured to extend over the exposed part of the leading edge assembly 13. The cover panel 20 is arranged to extend over all of the exposed parts of the leading edge assembly 13 and the leading edge assembly 13 is assembled with the wing box 12. In alternative embodiments, the cover panel 20 is configured to extend over part of the exposed parts of the leading edge assembly 13 when the leading edge assembly 13 is assembled with the wing box 12. It will be understood that two or more cover panels 20 may be used to cover all or part of the leading edge assembly 13.

The cover panel 20 extends over the leading edge panel 30. The leading edge panel 30 is received by the cover panel 20. The profile of the cover panel 20 and shape of the cover panel 20 corresponds to that of the leading edge panel 30 such that the cover panel 20 lies against the leading edge panel 30 when assembled together.

Figure 8:
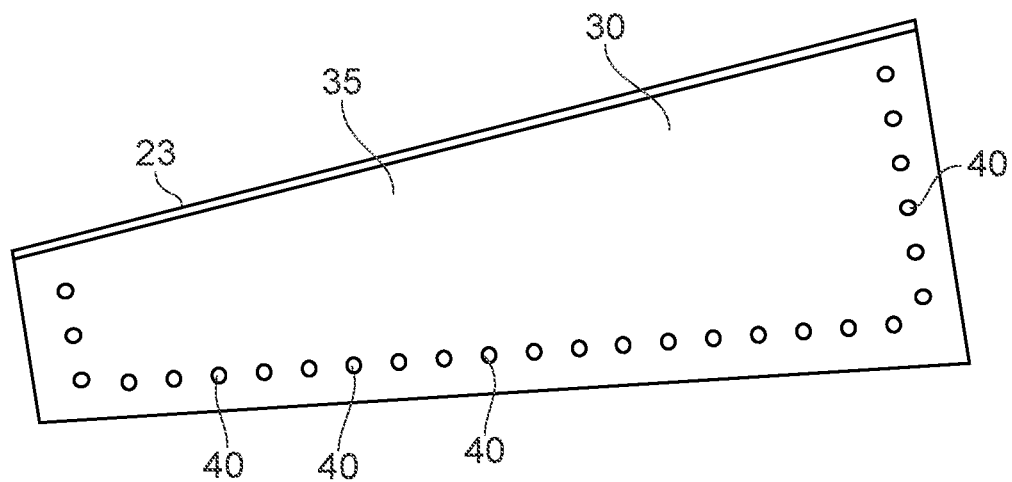
FIG. 8 is a schematic plan view from below of part of the wing leading edge assembly including fastening members in the fastened condition.

Referring to FIG. 4, the leading edge panel 30 comprises a body 30 having an outer side 34 and an inner side 35. The outer and inner sides 34, 35 form the surfaces of the leading edge panel 30. Holes 33 are formed through the leading edge panel 30. The holes 33 are preformed, and configured to mount the cover panel 20 to the leading edge panel 30. The holes 33 extend through the leading edge panel 30. The holes 33 are arranged in a preconfigured arrangement, as is clear from FIG. 8. In FIG. 8, the holes are shown arranged around the periphery of the leading edge panel 30 although it will be understood that alternative arrangements of holes are anticipated.

The cover panel 20 will now be described in further detail with reference to FIGS. 3 and 4. The cover panel 20 is generally C-shaped. The shape of the cover panel 20 corresponds substantially to that of the outer side 34 of the leading edge panel 30. The cover panel 20 has an outer surface 23 and an inner surface 24. The outer surface 23 forms an exposed surface of the leading edge assembly 13 when the leading edge assembly 13 is assembled. The outer surface 23 forms an aerodynamic surface of the leading edge assembly 13. That is, the aerodynamic surface is exposed to airflow over and against the surface during operation of the aircraft 1.

The cover panel 20 has an outer layer 21 and an inner layer 22. In the present arrangement, the cover panel 20 comprises two layers although it will be understood that the number of layers may differ and may comprise a single layer or a plurality of layers. In embodiments in which the cover panel 20 comprises a single layer, the outer layer 21 is combined with the inner layer 22 to form both the outer, aerodynamic, surface 23 the inner surface 24.

The outer layer 21 is configured to act as an erosion shield. The outer layer 21 is formed from a metallic material, such as titanium. The outer layer 21 forms the outer surface 23 which is configured as a smooth surface with no indents or protrusions. The outer layer 21, acting as the erosion shield, is configured to maintain a smooth surface even in an erosive environment. The outer layer 21 covers the inner layer 22.

The inner layer 22 is a thermoplastic layer. The inner layer 22 is formed from a thermoplastic, with suitable thermoplastics including polyether ether ketone (PEEK). Other suitable thermoplastic polymers may be used, for example thermoplastics in the polyaryletherketone (PAEK) family. The inner surface 24 of the cover panel 20 is formed from the thermoplastic material.

A heating configuration 26 is embedded in the inner layer 22. The heating configuration 26 is received in the thermoplastic. The heating configuration 26 acts as a wing ice protection system (WIPS) to help avoid icing of the leading edge. The heating configuration 26 comprises electrically conductive elements, such as wires or tracks, embedded in the thermoplastic. The electrically conductive elements are formed as an electrically conductive mesh. Alternative configurations for the heating configuration 26 are anticipated. The heating configuration 26 is connected to a power supply (not shown).

The outer and inner layers 21, 22 of the cover panel 20 are bonded together. The outer and inner layers 21, 22 form a one-part component. The assembled cover panel 20 is mounted to the leading edge panel 30. The inner surface 24 of the cover panel 20 is configured to correspond with the outer side 34 of the leading edge panel 30. When brought together, the inner surface 24 is configured to lie against the outer side 34 of the leading edge panel 30. When the cover panel 20 is brought together with the leading edge panel 30, portions of the inner surface 24 of the cover panel 20 are exposed internally through the holes 33 in the leading edge panel 30.

With known attachment methods, such as using rivets or countersunk bolts, apertures are formed through the cover panel 20 at the position of the holes 33 to allow the fasteners, such as rivets or countersunk bolts, to extend through the leading edge panel 30 and cover panel 20 to fasten the cover panel 20 and leading edge panel 30 to each other. Such an arrangement leads to an interruption of the outer, aerodynamic surface 23.

As shown in FIGS. 5 to 8, fastening members 40 are welded to the inner surface 24 of the cover panel 20. The fastening members 40 do not protrude through the cover panel 20. Two fastening members 40 are shown in each of FIGS. 5 to 7. However, it will be understood that the number of fastening members 40 will vary, and an example of an array of fastening members is shown in FIG. 8. Sufficient fastening members 40 are used to ensure adequate fastening of the cover panel 20 to the leading edge panel 30.

Figure 5:
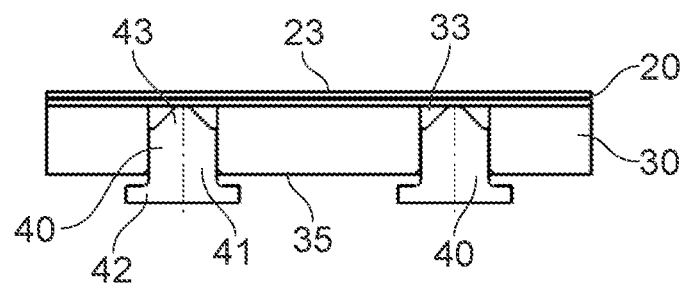
FIG. 5 is a schematic cross-sectional side view of part of the wing leading edge assembly including two fastening members in an unfastened condition.
Figure 6:
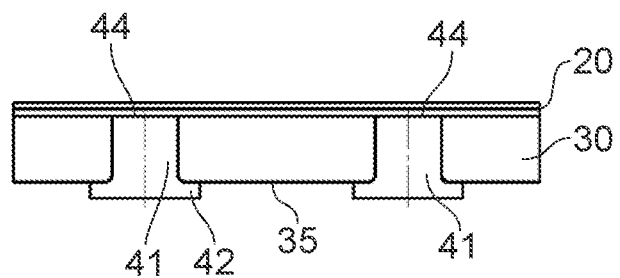
FIG. 6 is a schematic cross-sectional side view of part of the wing leading edge assembly including two fastening members in a fastened condition.

One of the fastening members 40 will now be described in detail. The fastening member 40 is formed from a thermoplastic. A suitable thermoplastic is polyether ether ketone (PEEK). Other suitable thermoplastic polymers may be used, for example thermoplastics in the polyaryletherketone (PAEK) family. The fastening member 40 comprises a shaft 41 and a shoulder 42. FIG. 5 shows the fastening member 40 in an unfastened condition with the cover panel 20, and FIG. 6 shows the fastening member 40 in a fastened condition with the cover panel 20. In the unfastened condition, the fastening member 40 comprises a welding material portion 43 at an opposing end of the shaft 41 to the shoulder 42. The shoulder 42 is at one end of the shaft 41. The diameter of the shaft 41 corresponds substantially to the diameter of the hole 33. The relative dimensions may vary dependent on accounting for tolerances, for example.

The length of the shaft 41 substantially corresponds to the depth of the hole 33. The welding material portion 43 protrudes from the end of the shaft 41. The diameter of the shoulder 42 is greater than the diameter of the hole 33. The shoulder 42 is configured to locate against the inner side 35 of the leading edge panel 30. The shoulder 42 is a flange. The welding material portion 43 at the end of the shaft 41 is generally conical shaped. The welding material portion 43 may vary in dimensions in dependence on the required volume of material required. The fastening member 40 is formed as a one-part component.

To assemble the leading edge panel 30 and cover panel 20, the cover panel 20 is received over the leading edge panel 30 and located in the correct position. The inner surface 24 of the cover panel 20 locates against the outer side 34 of the leading edge panel 30. The thermoplastic inner surface 24 of the cover panel 20 is exposed through the holes 33. One or more of the thermoplastic fastening members 40 is inserted into one or more corresponding holes 33 in the leading edge panel 30. The thermoplastic fastening member 40 may be joined together with the cover panel 20 by welding. The cover panel 20 and thermoplastic fastening member 40 may be joined together by any suitable welding method which causes coalescence between the parts, including for example ultrasonic welding. Other suitable methods include solid state welding methods such as spin welding, and vibration welding. In the case of ultrasonic welding the fastening member 40 is contacted by a respective ultrasonic tool, and welded together with the inner layer 22 with ultrasonic energy from the ultrasonic tool.

The welding material portion 43 is a protruding weld feature. The welding material portion 43 is brought into contact with the inner surface 24 and provides an interference distance. The fastening member 40 is then urged towards the inner layer 22 to the fastened condition of FIG. 6. In the case of ultrasonic welding, ultrasonic energy is applied during movement by the ultrasonic tool (not shown). This ultrasonic energy causes the inner surface 24 and the material welding portion 43 to coalesce with each other. The coalesced material forms a coalesced juncture 44 between the inner surface 24 and the shaft 41 of the fastening member 40.

The protruding arrangement of the welding material portion 43 provides a sharp edge or point and is the first part of the welding material portion 43 to come into contact with the inner surface 24. This acts as an energy director which focuses the ultrasonic energy into the region of contact as the contacting surfaces coalesce.

Figure 7:
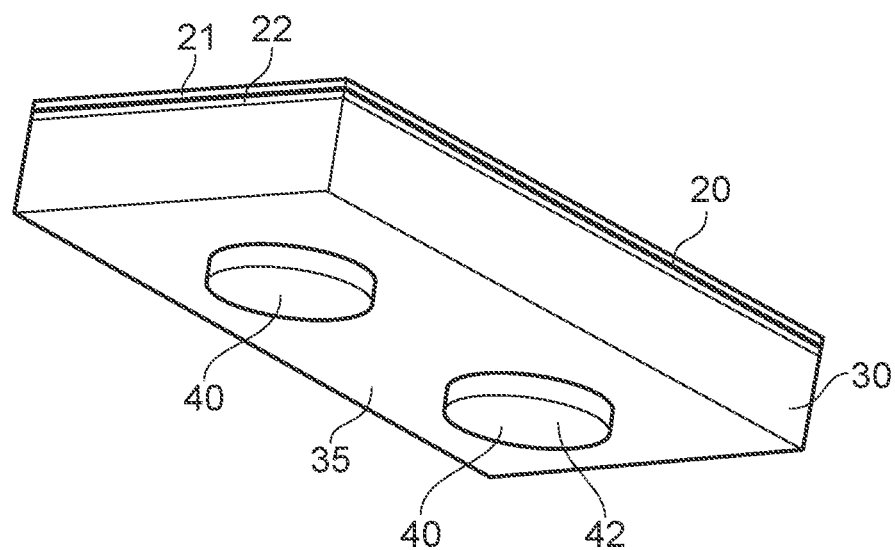
FIG. 7 is a schematic perspective view of part of the wing leading edge assembly including two fastening members in the fastened condition.

When the welding is complete, the shoulder 42 of the fastening member 40 abuts the inner side 35 of the leading edge panel 30. As such, the leading edge panel 30 is retained in a fixed position between the shoulder 42 and the inner surface 24 of the cover panel 20. Relative movement of the cover panel 20 with the leading edge panel 30 is therefore restrained. The process is repeated for each of the fastening members 40. Two assembled fastening members 40 welded with the cover panel 20 are shown in FIG. 7. The distribution of welded fastening members 40 with the cover panel 20 is shown in FIG. 8. It will be understood that each of the inner layer 22 and fastening member 40 may be formed from differing materials, for example different thermoplastics. Once assembled, the leading edge assembly 13 including the cover panel 20 is fixedly assembled. In the event that replacement of the cover panel 20 is desired, for example to replace the outer layer 21 acting as the erosion shield, for example due to damage to the erosion shield, or to replace the heating configuration 26, then the cover panel 20 may be replaced without the need to replace the entire leading edge assembly 13. Each of the fastening members 40 may be removed by drilling through the fastening member 40 at the location of each hole 33. Upon removal of each of the fastening members 40, the cover panel 20 may be removed from the leading edge panel 30 without damage to the leading edge panel 30. Another cover panel 20 may then be affixed to the leading edge panel 30, through use of new fastening members 40 welded to the cover panel 20.

Figure 2:
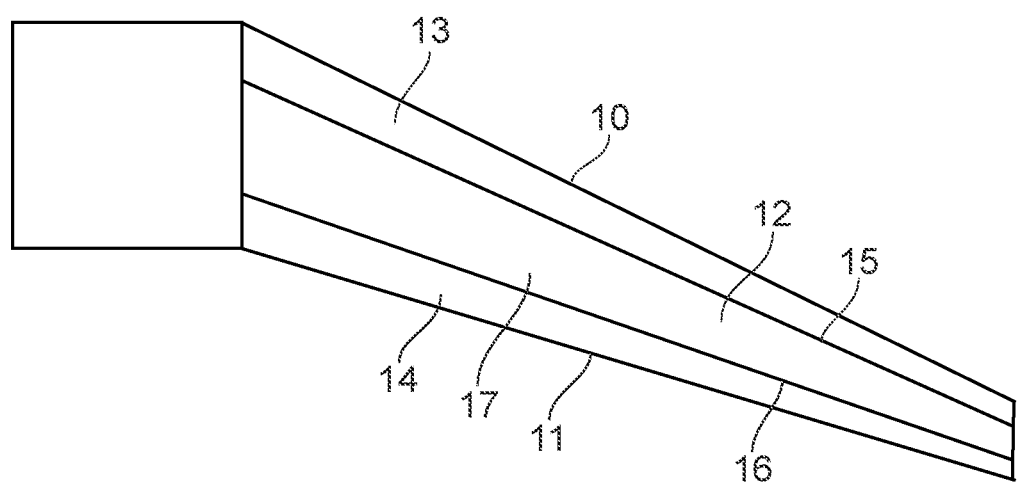
FIG. 2 is a schematic view of the starboard wing of the aircraft.

Referring to FIG. 2, the aircraft wing 3 has a leading edge 10 and a trailing edge 11. The wing has a wing box 12, a leading edge assembly 13 and a trailing edge assembly 14. The leading edge assembly 13 is forward of the wing box 12 and defines the leading edge 10. The trailing edge assembly 14 is rearward of the wing box 12 and defines the trailing edge 11.

In the above description, the term "front" refers to components towards the leading edge of the wing, and the term "rear" refers to components towards the trailing edge of the wing. The terms "forward" and "rearward" shall be construed accordingly. The position of features may be construed relative to other features, for example a forward component may be disposed on a forward side of another component, but towards the rear of the vehicle. Similarly, the terms "upper" and "lower" refer to the position of features relative to other features and in accordance with a normal orientation of the aircraft 1.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without.

departing from the scope of the invention as defined in the appended claims.

The invention claimed is:

1. An aircraft assembly comprising:
a structural component,
a cover panel located over the structural component and comprising a thermoplastic layer with an inner surface, and
a thermoplastic fastening member extending through the structural component and welded to the inner surface, with the structural component fastened between the inner surface and the fastening member.

2. The aircraft assembly of claim 1, wherein the thermoplastic fastening member is welded to the inner surface of the cover panel by mechanical welding.

3. The aircraft assembly of claim 2, wherein the thermoplastic fastening member is welded to the inner surface of the cover panel by at least one of ultrasonic welding, spin welding, and vibration welding.

4. The aircraft assembly of claim 1, wherein the cover panel comprises an aerodynamic surface.

5. The aircraft assembly of claim 4, wherein the cover panel comprises an outer layer and the thermoplastic layer, the outer layer defining the aerodynamic surface.

6. The aircraft assembly of claim 5 wherein the outer layer is adhered to the thermoplastic layer.

7. The aircraft assembly of claim 5, wherein the outer layer is an erosion shield.

8. The aircraft assembly of claim 1, wherein the cover panel comprises a heating configuration.

9. The aircraft assembly of claim 8, wherein the heating configuration is embedded in the thermoplastic layer.

10. The aircraft assembly of claim 8, wherein the heating configuration comprises an electrically conductive mesh.

11. The aircraft assembly of claim 1, wherein the thermoplastic fastening member does not extend through the cover panel.

12. The aircraft assembly of claim 1, wherein the thermoplastic fastening member comprises a shaft and a shoulder, wherein the shaft extends through the structural component, and at least part of the structural component is between the cover panel and the shoulder.

13. The aircraft assembly of claim 1, wherein the thermoplastic fastening member extends through a preformed hole in the structural member.

14. A wing leading edge assembly comprising the aircraft assembly of claim 1.

15. The wing leading edge assembly of claim 14, wherein the structural component is a leading edge panel.

16. The wing leading edge assembly of claim 14, wherein the wing leading edge assembly is a natural laminar flow wing leading edge assembly.

17. An aircraft comprising the aircraft assembly of claim 1.

18. An aircraft assembly comprising:
a structural component,
a cover panel comprising a thermoplastic layer,
a thermoplastic fastening member extending through the structural component, and
a coalesced juncture between the thermoplastic layer and the thermoplastic fastening member,
wherein the structural component is fastened between the thermoplastic layer and the fastening member.

19. A method of assembling an aircraft assembly comprising:
locating a cover panel over the structural component, the cover panel comprising a thermoplastic layer with an inner surface;
inserting a thermoplastic fastening member to extending through the structural component to locate against the inner surface; and
welding the thermoplastic fastening member to the inner surface of the cover panel to fasten the cover panel to the structural component.

20. A kit of parts which can be assembled to provide an aircraft assembly, the kit of parts comprising:
a structural component,
a cover panel configured to locate over the structural component and comprising a thermoplastic layer with an inner surface, and
a thermoplastic fastening member configured to extend through the structural component and be welded to the inner surface, so that the structural component is fastened between the inner surface and the fastening member.

* * * * *